Patented Oct. 13, 1953

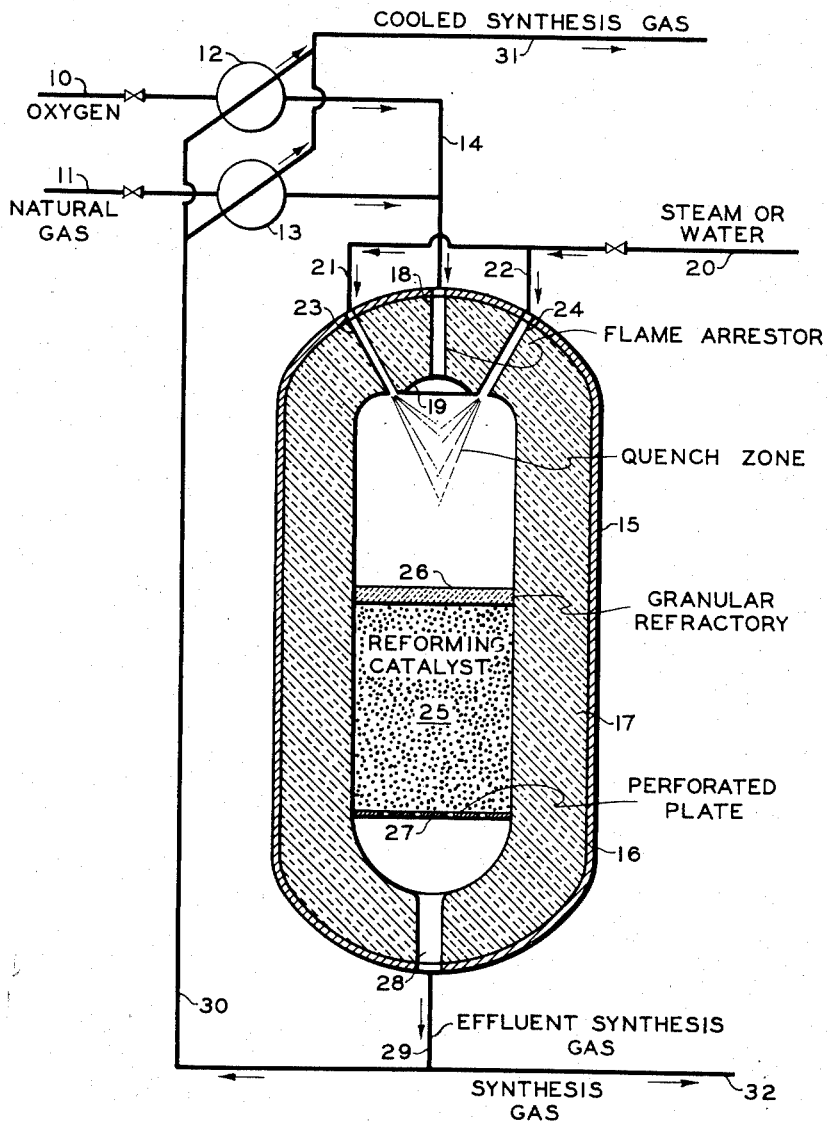

2,655,442

UNITED STATES PATENT OFFICE 2,655,442

PROCESS AND APPARATUS FOR THE MANUFACTURE OF SYNTHESIS GAS

Bertrand J. Mayland, Bartlesville, Okla., assignor to Phillips Petroleum Company, a corporation of Delaware Application August 23, 1948, Serial No. 45,718

9 Claims. (Cl. 48—196)

This invention relates to a process for manufacturing carbon monoxide and hydrogen synthesis gas. In one of its more specific aspects, it relates to an improved process and apparatus for making synthesis gas by the partial oxidation of natural gas.

In the production of carbon monoxide and hydrogen synthesis gas for use in such processes as Fischer-Tropsch and methanol synthesis, the cost of oxygen and also of methane, the major constituent of natural gas, may be of controlling importance. In the preparation of such synthesis gas by partial combustion of natural gas or pure methane, there is a certain temperature range within which carbon is formed from cracking of the hydrocarbons. In a process where this occurs, it is necessary to introduce an additional amount of oxygen to utilize thus-formed carbon. It is therefore of great advantage to eliminate or to bring to an absolute minimum this formation of carbon which reduces the volume of product synthesis gas formed per volume of natural gas and oxygen used.

Another usual feature in the production of carbon monoxide and hydrogen synthesis gas is the introduction of a sufficient excess of oxygen to burn with a calculated portion of the natural gas forming carbon dioxide and water, which reaction is highly exothermic. By this means the necessary heat for the partial oxidation of the natural gas to carbon monoxide and hydrogen is furnished. It would therefore be advantageous also to eliminate or reduce the oxygen requirement for supplying heat for the reaction.

An object of this invention is to provide a method for the manufacture of carbon monoxide and hydrogen synthesis gas.

Another object is to economically produce carbon monoxide and hydrogen synthesis gas.

Another object is to reduce the amount of oxygen required to produce carbon monoxide and hydrogen synthesis gas.

Another object is to reduce the amount of natural gas required to produce synthesis gas.

Another object is to provide a method for manufacturing synthesis gas containing carbon monoxide and hydrogen in a ratio of 1:2.

Still another object is to reduce the volume of water necessary to form synthesis gas in a ratio of 1:2.

Another object is to provide an apparatus for manufacturing synthesis gas containing carbon monoxide and hydrogen.

Other objects and advantages of my invention will be apparent to one skilled in the art from the accompanying disclosure and discussion.

I have discovered a method for reducing carbon formation without increasing the consumption of oxygen and natural gas in the production of carbon monoxide and hydrogen synthesis gas. I have found that carbon formation is greatly reduced when natural gas and oxygen are preheated, and after only partial oxidation, the thus-formed gases are rapidly quenched through the carbon forming temperature range with, preferably, low quality steam, or water. Further, I have discovered that the unreacted natural gas which is present in the quenched mixture may be advantageously reformed over a suitable catalyst, thus providing additional carbon monoxide and hydrogen synthesis gas.

The partial oxidation of natural gas at elevated temperatures proceeds in two simultaneous steps, the second being dependent upon the first. In step (1) the oxygen is used up rapidly forming carbon dioxide and steam as well as carbon monoxide and hydrogen, leaving considerable unreacted natural gas, and in step (2) the remaining unreacted natural gas is reformed with the carbon dioxide and steam to give additional carbon monoxide and hydrogen. The first step, being highly exothermic, tends to develop a high temperature that is limited by the rate of the second step which is endothermic. As the second step proceeds, the temperature drops from the peak temperature which is in the range of 2700 to 3000° F. to the equilibrium temperature which is in the range of 2300 to 2500° F. Due to the mechanism of the reaction, elemental carbon is formed before equilibrium is reached and once formed is not reoxidized in a reasonable time. The carbon is formed by cracking of the residual unreacted natural gas, before step (2) is complete, and as the temperature drops from the peak temperature to the equilibrium temperature. Maintaining the reaction temperature within the range of 2700 to 3000° F. speeds up the second step relative to the cracking reaction, thus decreasing the formation of carbon. However, to maintain the high temperature level requires a greater consumption of oxygen and natural gas for a given production of active synthesis gas.

In accordance with my invention, I preferably preheat the natural gas and oxygen reactants to a temperature up to about 1000° F., and then admix same prior to introduction to the reaction chamber. The preheated and admixed materials are introduced to a refractory lined reaction chamber where they are burned in one or more burners, preferably cup burners, which may be made of ceramic material, at a temperature in the range of 2700° to 3000° F. It is often desirable to introduce the reactants to the burners, when preheated, through flame arresting means. Immediately after initial combustion, which proceeds according to step (1) above and which requires about 0.005 to 0.2 second, the hot gases are rapidly quenched with steam or water, introduced around each burner in converging streams, to a temperature below 2300° F. and preferably to a temperature of about 2100° F., thus substantially inhibiting the reforming step wherein the cracking takes place. When a steam quench is used, it is preferable to use low quality steam i. e., steam which is almost cool enough, or at a high enough pressure, to condense to water. By this means the rates or both reforming and cracking of the unreacted natural gas will be negligible at practical space velocities. Since the ratio of hydrogen to carbon monoxide, obtained by the oxidation of natural gas with oxygen, is lower than desired for processes such as Fischer-Tropsch or methanol synthesis (about 1.87 for pure methane and 1.70 for typical natural gas), the addition of quench steam for later catalytic reaction with residual natural gas has the desirable effect of raising this ratio in the ultimate synthesis gas product. Introducing the steam with the gas feed would have the same effect on the hydrogen to carbon monoxide ratio, but the benefits of my invention whereby the gases are quenched rapidly through the carbon forming temperature range would be lost.

The quenched gas mixture is then passed through a bed of reforming catalyst such as one of the oxides of the elements in the VIII group of the 4th series of the periodic system, such as reduced nickel oxide, which is selective for the reforming reaction in preference to the cracking reaction, to complete the utilization of the natural gas. Preferably the catalyst bed is within the chamber wherein the partial oxidation reaction takes place and in the direction of flow therefrom. When this is the case, it is quite desirable to cover the top of the catalyst with a thin layer of a suitable granular refractory material, such as Alundum, to shield the catalyst from radiation from the combustion flame.

The product synthesis gas composed of carbon monoxide and hydrogen in the ratio of 1:2 is removed from the reaction chamber, and in a preferred embodiment of my invention, a portion of it is used to preheat the natural gas and oxygen reactants by heat exchange and another portion is passed to a waste heat boiler for steam generation.

Although in the above discussion, the hydrocarbon reactant referred to is natural gas, my invention is also applicable to the partial oxidation and catalytic reforming of any of the normally gaseous hydrocarbons, either pure or in admixture.

A further understanding of some of the many aspects of my invention may be had by referring to the attached diagram, wherein one suitable reaction chamber is shown in cross-section, in conjunction with the following discussion. Various additional valves, pumps, and other conventional equipment, will be familiar to one skilled in the art and have been omitted from the drawing for the sake of clarity. This description and drawing provides one method of operating my process. It is understood, however, that while this is representative in general of my process various minor changes may be made in adapting the process to the various conditions within the scope of the invention.

Refer now to the drawing. Oxygen and natural gas are passed through lines 10 and 11, and heat exchangers 12 and 13, respectively, to line 14 where they are admixed. From line 14 the heated admixture is passed into cylindrical reaction chamber 15 comprised of metal shell 16 closed at either end and refractory heat resistant lining 17 through flame arrestor 18 to burner 19 which may be any suitable burner such as a ceramic cup burner. Steam, preferably of low quality, and/or water is passed through line 20 to lines 21 and 22 which introduce same to reaction chamber 15 through inlet means 23 and 24 arranged peripherally around burner 19 so that the streams of material issuing therefrom converge just past burner 19 and quench the flame. Inlet conduits represented by numbers 23 and 24 may be two or more in number. They may be inclined as shown or may be positioned perpendicularly to the axis of the reactor at such points as to allow the desired reaction time before quenching. In this manner, the gases produced by burning of the natural gas and oxygen may be readily quenched before complete oxidation takes place and before carbon formation due to cracking of unreacted natural gas or reforming of the oxidation products occurs. The quenched gases which are also cooled, now containing steam added in the quenching, flow downwardly through chamber 15 and are immediately passed through a bed of suitable reforming catalyst 25, the top of which is covered by a thin layer of granular refractory elements 26. Perforated plate 27 is horizontally positioned with respect to chamber 15 and is located in the bottom thereof as a support means for catalyst 25. Catalyst 25 preferably occupies about 10 to 75 per cent of the internal volume of reaction chamber 15. The downwardly flowing gases which are carbon monoxide and hydrogen and some steam pass through catalyst bed 25 and perforated plate 27 and out axially positioned outlet means 28. From outlet means 28 effluent gases pass through line 29 and a portion of same are passed therefrom via line 30 to heat exchangers 12 and 13 where it imparts heat to the oxygen and natural gas being charged to the reaction chamber.

From heat exchangers 12 and 13, the effluent gas is removed via line 31. The remaining portion of the effluent gases from line 29 is passed via line 32 to a steam generator, not shown, for producing steam for the quench or to other suitable means to utilize the heat remaining therein. It is within the scope of my invention to use more than one burner and quench arrangement either within a single reaction chamber or in several chambers.

Advantages of my invention are illustrated by the following examples. The reactants and their proportions, and other specific ingredients, are presented as being typical and should not be construed to limit the invention unduly. The three examples, the third of which demonstrates my improved process, are given as a means for showing the advantages of my process. As a basis of comparison, it is assumed that the natural gas used consists of essentially all methane, and that the reactions are carried out at atmospheric pressure.

*Example I*

One mol of natural gas and 0.628 mol of oxygen preheated to a temperature of about 1000°

F. are reacted to equilibrium at a reaction temperature of approximately 2600° F. giving 2.76 mols of hydrogen and carbon monoxide in a ratio of 1.87:1. At this temperature, little carbon will be formed; however, the desired ratio of hydrogen to carbon monoxide of 2:1 is not obtained.

*Example II*

One mol of natural gas, 0.653 mol of oxygen, and 0.332 mol of steam, preheated to a temperature of about 1000° F., are reacted to equilibrium at a temperature of approximately 2600° F., giving only 2.71 mols of hydrogen and carbon monoxide, but in a ratio of 2:1. Again little carbon is formed, but a smaller volume of the desired gases is obtained.

*Example III*

Proceeding according to my invention, 1 mol of natural gas and 0.600 mol of oxygen, preheated to a temperature of about 1000° F., are reacted at a temperature of about 2700° F. Low quality steam in an amount of 0.250 mol is introduced as shown in the attached drawing, rapidly quenching the hot gases through the carbon forming temperature range to 2300° F. before equilibrium is attained. The quenched gases are immediately contacted with reduced nickel oxide catalyst in a lower portion of the reaction chamber whereby the unreacted natural gas is consumed and equilibrium is reached at a temperature of about 2100° F. By operating in this manner, 2.80 mols of hydrogen and carbon monoxide are produced in a ratio of 2:1, and little carbon is formed.

By comparing the data of Example III with that in Examples I and II it may be seen that there is a saving of 8.8 per cent in oxygen and 1.4 per cent in natural gas. In addition, the desired ratio of hydrogen to carbon monoxide of 2:1 is obtained, and the water requirement is reduced by 24 per cent.

Advantages of my invention are maximum production of carbon monoxide and hydrogen synthesis gas in a ratio of 1:2 and reduction in consumption of oxygen, natural gas, and steam per volume of product synthesis gas.

Although this process has been described and exemplified in terms of its preferred modifications, it is understood that various changes may be made without departing from the spirit and scope of the disclosure and of the claims.

I claim:

1. An improved process for the manufacture of carbon monoxide and hydrogen synthesis gas, which comprises introducing natural gas and oxygen into a refractory lined chamber, burning said natural gas with said oxygen in a burner at a temperature above about 2700° F., the product of said burning containing carbon monoxide, carbon dioxide, $H_2O$, unreacted natural gas, and hydrogen, rapidly quenching these gases, to a temperature below about 2300° F. but sufficiently elevated to effect reforming thereof, with $H_2O$ introduced around said burner so as to converge on hot gases passing therefrom, passing said quenched gases through a reforming catalyst and thereby converting unreacted natural gas to additional carbon monoxide and hydrogen, and recovering said carbon monoxide and hydrogen as synthesis gas.

2. An improved process for the manufacture of carbon monoxide and hydrogen synthesis gas, which comprises preheating natural gas and oxygen, introducing said heated natural gas and oxygen into a refractory lined chamber, burning said natural gas with said oxygen in a cup burner at a temperature above about 2700° F., the product of said burning containing carbon monoxide, carbon dioxide, $H_2O$, unreacted natural gas, and hydrogen, rapidly quenching these gases, to a temperature below about 2300° F. but sufficiently elevated to effect reforming thereof, with low quality steam and water introduced around said burner so as to converge on hot gases passing therefrom before complete oxidation of said hydrocarbon takes place, passing said quenched gases through a reforming catalyst and thereby converting unreacted natural gas to additional carbon monoxide and hydrogen, and recovering said carbon monoxide and hydrogen in the form of synthesis gas as a product of the process.

3. An improved process for the manufacture of carbon monoxide and hydrogen synthesis gas, which comprises preheating a normally gaseous hydrocarbon and oxygen to a temperature up to 1000° F., admixing said heated hydrocarbon and oxygen and introducing said admixture into a refractory lined chamber, burning said hydrocarbon with said oxygen in a ceramic cup burner at a temperature in the range of 2700 to 3000° F., the product of said burning containing carbon monoxide, carbon dioxide, $H_2O$ unreacted hydrocarbon, and hydrogn, rapidly quenching thus formed gases, to a temperature below about 2300° F. but sufficiently elevated to effect reforming thereof, with low quality steam introduced around said burner so as to converge on hot gases passing therefrom before complete oxidation of said hydrocarbon takes place, immediately passing said quenched gases through a reforming catalyst in a down stream zone of said chamber and thereby converting unreacted hydrocarbons to additional carbon monoxide and hydrogen, and recovering said carbon monoxide and hydrogen in the form of synthesis gas from said chamber as a product of the process.

4. In a process according to claim 3, the steps of introducing said gaseous hydrocarbon, oxygen, and steam to said reaction chamber in such quantities that said carbon monoxide and hydrogen synthesis gas product is recovered in a ratio of 1:2.

5. An improved process for the manufacture of carbon monoxide and hydrogen synthesis gas, which comprises preheating natural gas and oxygen to a temperature up to 1000° F., admixing said heated natural gas and oxygen and introducing said admixture into a refractory lined chamber, burning said natural gas with said oxygen in a ceramic cup burner at a temperature in the range of 2700 to 3000° F., the product of said burning containing carbon monoxide, carbon dioxide, $H_2O$, unreacted natural gas, and hydrogen, rapidly quenching thus formed gases through the carbon forming temperature range to a temperature below 2300° F. but not appreciably lower than about 2100° F. with low quality steam introduced around said burner so as to converge on hot gases passing therefrom before the complete oxidation of said nautral gas, passing said quenched gases through a reforming catalyst in a down-stream zone of said chamber upon the top of which has been deposited a protective layer of granular refractory material and thereby converting unreacted natural gas to additional carbon monoxide and hydrogen, introducing said natural gas, oxygen, and steam in such quantities that carbon monoxide and hydrogen synthesis gas in the ratio of 1:2 are recovered from said chamber as a product of the process.

6. An improved process for the manufacture of carbon monoxide and hydrogen synthesis gas in a ratio of 1:2, which comprises preheating natural gas and oxygen to a temperature up to 1000° F., admixing said heated natural gas and oxygen and introducing said admixture into a refractory lined chamber through a flame arresting zone, burning said natural gas with said oxygen in a ceramic cup burner at a temperature in the range of 2700 to 3000° F., the product of said burning containing carbon monoxide, carbon dioxide, $H_2O$, unreacted natural gas, and hydrogen, rapidly quenching thus formed gases through the carbon forming temperature range to a temperature below 2300° F. but not appreciably lower than about 2100° F., with low quality steam introduced around said burner so as to converge on hot gases passing therefrom before the complete oxidation of said natural gas, passing said quenched gases through a reforming catalyst in a down-stream zone of said chamber upon the top of which has been deposited a thin protective layer of granular refractory material and thereby converting unreacted natural gas to additional carbon monoxide and hydrogen, recovering said carbon monoxide and hydrogen in a ratio of 1:2 from said reaction zone as a product of the process, and preheating said natural gas and oxygen charge stocks by heat exchange with said product gas.

7. An improved process for the manufacture of carbon monoxide and hydrogen synthesis gas in a ratio of 1:2, which comprises preheating methane and oxygen in a ratio of 1 mol of methane to 0.6 mol of oxygen to a temperature up to 1000° F., admixing said heated methane and oxygen and introducing said admixture into a refractory lined chamber through a flame arresting zone, burning said methane with said oxygen in a ceramic cup burner at a temperature in the range of 2700 to 3000° F., the product of said burning containing carbon monoxide, carbon dioxide, $H_2O$, unreacted methane, and hydrogen, rapidly quenching thus formed gases through the carbon forming temperature range to a temperature below 2300° F. but not appreciably lower than about 2100° F. before complete oxidation of said methane takes place with 0.25 mol of low quality steam per mol of methane charge introduced around said burner to converge on said hot gases, immediately passing said quenched gases through a nickel oxide reforming catalyst in another zone of said chamber down stream from said burner upon the top of which has been placed a thin protective layer of granular Alundum and thereby converting unreacted methane to additional carbon monoxide and hydrogen, recovering said carbon monoxide and hydrogen from said chamber as 1:2 synthesis gas, and preheating said methane and oxygen charge stock by heat exchange with same.

8. An improved apparatus for manufacturing synthesis gas containing carbon monoxide and hydrogen in a ratio of 1:2, which comprises a cylindrical reaction chamber formed by a metal shell, top and bottom members of said shell, and a refractory heat resistant lining therefor, axially positioned inlet means comprising a flame arrestor in the top of said shell, ceramic cup burner means downstream of and communicating with said flame arrestor, a plurality of radially disposed inlet means at the top of said reaction chamber and surrounding said burner and in open communication with the inside of said reaction chamber substantially at the place at which the said burner means is located and in said chamber surrounding said burner means for introducing quench material in such a manner that it converges as a cone upon reaction materials as said materials are formed at said burner, perforate support means within said chamber horizontally positioned with respect to said chamber for solid catalyst, and axially positioned outlet means in the bottom of said chamber.

9. An improved apparatus for manufacturing synthesis gas containing carbon monoxide and hydrogen in the ratio of 1:2 which comprises a reaction chamber formed by a metal shell, top and bottom members of said shell, and a refractory heat resistant lining within said shell, axially positioned inlet means for natural gas and oxygen in the top of said shell, burner means for said natural gas and oxygen, a plurality of radially disposed inlet means for quench material at the top of said reaction chamber and surrounding said burner means and in open communication with the inside of said reaction chamber substantially at the place at which the said burner means is located and in said chamber surrounding said burner means such that the quench stream converges as a cone upon the reaction products as said products are formed at said burner, perforate support means in the bottom of said reaction chamber for solid catalyst, and outlet means in the bottom of said reaction chamber for product materials.

BERTRAND J. MAYLAND.

References Cited in the file of this patent

UNITED STATES PATENTS

| Number | Name | Date |
|---|---|---|
| 1,843,063 | Burke | Jan. 26, 1932 |
| 1,957,743 | Weitzel et al. | May 8, 1934 |
| 2,178,833 | Erasmus | Nov. 7, 1939 |
| 2,491,518 | Riblett | Dec. 20, 1949 |

FOREIGN PATENTS

| Number | Country | Date |
|---|---|---|
| 255,423 | Great Britain | Aug. 19, 1927 |